(12) United States Patent
Sobol et al.

(10) Patent No.: US 10,460,131 B2
(45) Date of Patent: Oct. 29, 2019

(54) PREVENTING ACCESS OF A HOST DEVICE TO MALICIOUS DATA IN A PORTABLE DEVICE

(71) Applicant: SanDisk Technologies LLC, Plano, TX (US)

(72) Inventors: Eyal Sobol, Givat Shmuel (IL); Nir Ofek Paz, Kiryat Tivon (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 0 days.

(21) Appl. No.: 15/690,387

(22) Filed: Aug. 30, 2017

(65) Prior Publication Data

US 2018/0004981 A1 Jan. 4, 2018

Related U.S. Application Data

(63) Continuation of application No. 13/233,984, filed on Sep. 15, 2011, now abandoned.

(51) Int. Cl.
*G06F 21/78* (2013.01)
*G06F 21/56* (2013.01)

(52) U.S. Cl.
CPC .............. *G06F 21/78* (2013.01); *G06F 21/56* (2013.01)

(58) Field of Classification Search
CPC ................................ G06F 21/78; G06F 21/56
See application file for complete search history.

(56) References Cited

U.S. PATENT DOCUMENTS 6,717,222 B2 * 4/2004 Zhang .................. G11C 7/18
257/390
7,725,941 B1 5/2010 Pavlyushchik
(Continued)

FOREIGN PATENT DOCUMENTS

WO 2008/048665 A2 4/2008

OTHER PUBLICATIONS

"D02.2 Requirements Definition and Specification"; Trusted Computing Group (TCG); dated Apr. 2007; pp. 1-141.
(Continued)

*Primary Examiner* — Oleg Korsak
*Assistant Examiner* — Devin E Almeida
(74) *Attorney, Agent, or Firm* — Patterson & Sheridan, LLP; Steven H. Versteeg

(57) ABSTRACT

A storage device comprising a memory, a controller, and a host interface operative to connect with a host. The memory containing data locations access to which are controllable by a protection application which is executable on a host. When the host interface operatively coupled to a host data locations in the memory are accessible to an operating system of the host only under permission from the protection application. The controller communicates with the protection application running on the host for allowing the protection application access to data locations in the memory. Upon a host request for access to a data location, the controller determines if permission to access the requested data location is acquired from the protection application. The permission is based on determination of the protection application that the data location does not contain malicious data harmful to the host operating system, to any application and/or to any data on the host.

20 Claims, 5 Drawing Sheets

(56) References Cited

U.S. PATENT DOCUMENTS

| | | | | |
|---|---|---|---|---|
| 8,452,744 | B2* | 5/2013 | Nichols | G06F 21/55 707/705 |
| 8,826,435 | B1* | 9/2014 | Chiang | G06F 21/567 713/193 |
| 9,015,840 | B2* | 4/2015 | Johnson | G06F 21/79 711/163 |
| 2004/0169651 | A1* | 9/2004 | Everitt | G06T 15/60 345/426 |
| 2004/0242029 | A1* | 12/2004 | Nakamura | G06K 19/077 439/66 |
| 2006/0195904 | A1* | 8/2006 | Williams | G06F 21/564 726/24 |
| 2007/0094314 | A1* | 4/2007 | Hsieh | G06F 17/30067 |
| 2007/0094654 | A1* | 4/2007 | Costea | G06F 8/65 717/168 |
| 2007/0261118 | A1 | 11/2007 | Lu | |
| 2008/0148101 | A1 | 6/2008 | Thornley et al. | |
| 2008/0148407 | A1* | 6/2008 | Katkar | G06F 21/566 726/24 |
| 2008/0313735 | A1* | 12/2008 | Harrison | G06F 21/51 726/23 |
| 2009/0031035 | A1* | 1/2009 | Dharmaraju | H04W 8/005 709/230 |
| 2009/0055918 | A1* | 2/2009 | Chang | G06F 21/445 726/10 |
| 2009/0113128 | A1* | 4/2009 | Zhao | G06F 21/56 711/115 |
| 2009/0307452 | A1* | 12/2009 | Hahn | G06F 21/57 711/164 |
| 2010/0154062 | A1 | 6/2010 | Baram et al. | |
| 2010/0287616 | A1* | 11/2010 | Yang | G06F 21/566 726/24 |
| 2011/0197280 | A1* | 8/2011 | Young | G06F 21/552 726/24 |
| 2013/0091575 | A1* | 4/2013 | Duncan | G06F 21/56 726/24 |
| 2013/0318610 | A1 | 11/2013 | Zaitsev | |

OTHER PUBLICATIONS

Rich, Donald; "Authentication in Transient Storage Device Attachments"; IEEE Computer; vol. 40, Issue 4; dated Apr. 2007; pp. 102-104.

Harley, David et al.; "White Paper: Heuristic Analysis—Detecting Unknown Viruses"; ESET, LLC; dated 2009; 24 pages.

The International Search Report and Written Opinion of the International Searching Authority for International Application No. PCT/US2012/052890; dated Dec. 7, 2012; 9 pages.

International Preliminary Report on Patentability for International Application No. PCT/US2012/052890; dated Mar. 18, 2014; 5 pages.

\* cited by examiner

PREVENTING ACCESS OF A HOST DEVICE TO MALICIOUS DATA IN A PORTABLE DEVICE

CROSS-REFERENCE TO RELATED APPLICATIONS

This application is a continuation application of co-pending U.S. patent application Ser. No. 13/233,984, filed on Sep. 15, 2011, which is incorporated herein by reference.

BACKGROUND

Using a portable storage medium, such as s USB Flash drive (UFD), with a variety of computer systems and other hosts has been rapidly increasing over the years because they are portable and they have small physical size and large storage capacity. However, connecting to a host a portable storage medium, such as USB drive or memory card, carrying malicious data may transfer a malware to the hosting device.

Some portable devices are equipped with an anti-malware protection application for protecting the operation of the operating system and protection applications of host devices to which they are connected to, and to protect host devices in general. Since loading of an anti-malware protection application from the portable storage device to the host device and launching it on the host device takes time, it also takes a while before the host device recognizes that the portable device mounted to it is infected. Until then the host device is susceptible to virus attacks and malicious data coming in from the portable storage device.

Hence there is a need to provide a more secure, but generic way that will protect computer systems and other host devices from receiving a malware from such portable devices.

SUMMARY

Embodiments of the present invention are defined by the claims, and nothing in this section should be taken as a limitation on those claims. As a brief introduction, embodiments described in this document and illustrated in the attached drawings generally relate to a storage device configured to protect host operations from potential infection of malicious data from the storage device. In a typical implementation, the storage device includes a memory for storing data, a controller, and a host interface operative to connect with a host. The memory containing data locations access to which are controllable by a protection application which is executable by a host. When the host interface is operatively coupled to a host data locations in the memory are assessable to an operating system of the host only under permission from the protection application.

Various embodiments described herein represent such controller, within the storage device, configured to communicate with the protection application running on the host for allowing the protection application access to data locations in the memory. Communication between the protection application running on the host and the controller in the storage device is for allowing the protection application access to data locations associated with a portion of the memory that is presented to the host as a removable memory (also referred to herein as a "removable partition"). More specifically, the protection application accesses file system tables and associated FAT (file allocation table) data, and optionally user-addressable data and other stored content, in search for possible malware with respect to data residing anywhere in the memory. In case malware is detected, the protection application handles the malware so as to assure that the malware is not accessible to the host operating system and does not contaminate the host.

Upon a host request for access to a data location received by the controller, the controller determines if permission to access the requested data location is acquired from the protection application, the permission being based on determination of the protection application that the data location does not contain malicious data harmful to the host operating system, to any application and/or to any data on the host.

The protection application, when running on a host, restricts access to data locations in the memory (in a portion of the memory that is presented to the host as a removable memory) by the operating system of the host. The protection application may reside on the host and executed directly from the host or loaded from the storage device for running on the host. Designing the storage device to have a protection application loaded thereon for running on the host advantageously provides for the storage device to be compatible to all current and future host types, regardless of changes in the underlying embodiments.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description serve to explain its principles. Wherever convenient, the same reference numbers will be used throughout the drawings to refer to the same or like elements.

DETAILED DESCRIPTION

Figure 1:
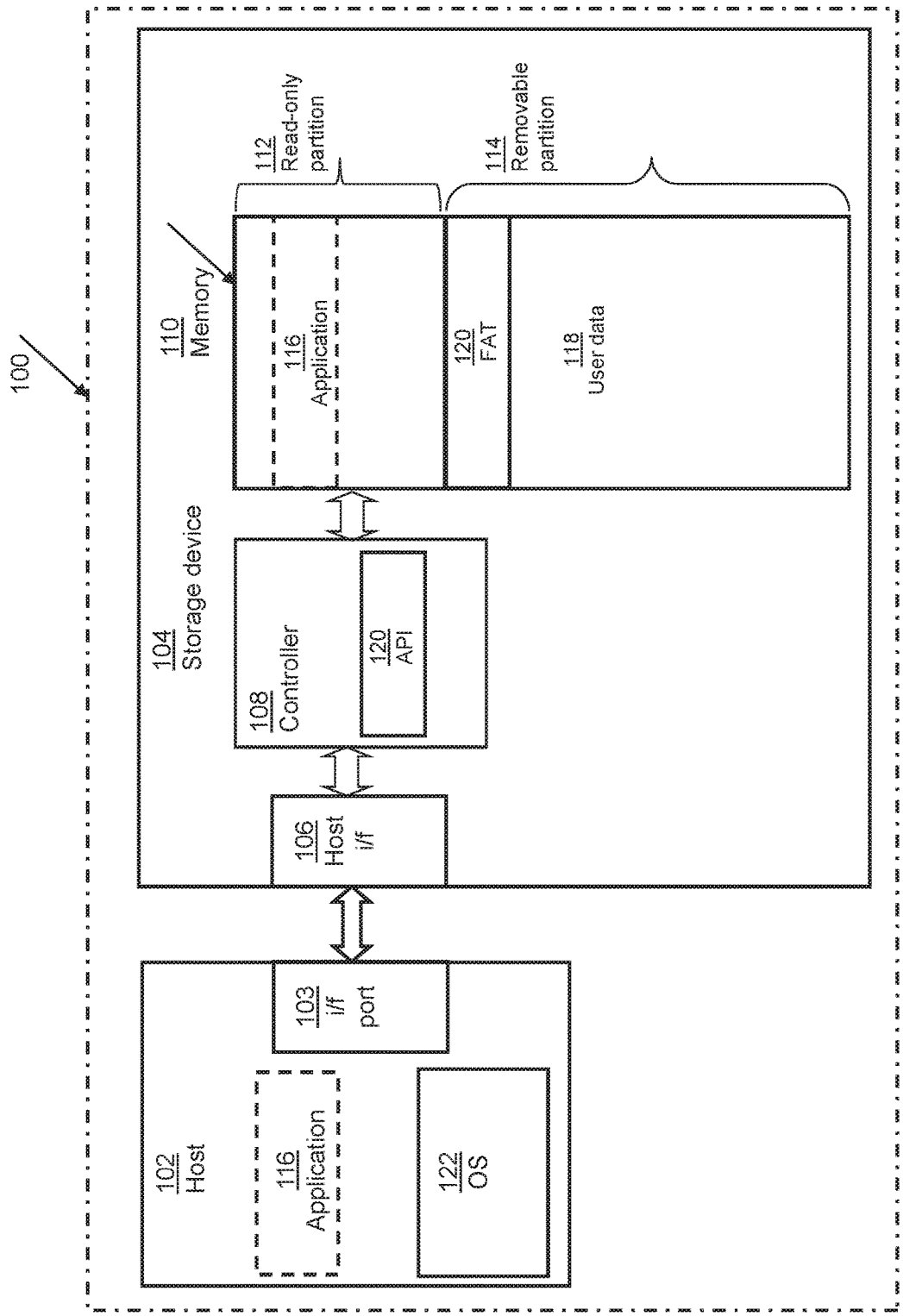
FIG. 1 illustrates one system with a storage device in which the invention is embodied.

Various modifications to and equivalents of the embodiments described and shown are possible and various generic principles defined herein may be applied to these and other embodiments. Thus, the claimed invention is to be accorded the widest scope consistent with the principles, features and teachings disclosed herein.

The disclosed embodiments described here are based, in part, on the observation that, when mounted to a computer system or embedded within, current storage devices may transfer malicious data and other malware onto the computer system. Hence, to protect the host operating system, any applications and/or any data of the computer system, and to protect the operation of host devices with such storage device in general there is a need to find a way for restricting access of the operating system of the host to malicious data on the storage device.

In general, malicious data or malware (malware is a derivation of the words "malicious" and "software") can be viewed as a computer program or application (e.g. program code) typically designed to access a computer system without the owner's informed consent (there can be various types of viruses, malware, harmful code or data, and collectively we simply refer to these as "malicious" applications or data). There are various examples of malware. These examples may include replicative objects, such as computer viruses and worms, capable of infecting other computer programs or applications by modifying them in such a way as to include a (possibly evolved) copy of itself. Malicious data may also include non-replicative objects, such as Trojan horses, that claim to perform some desirable or necessary function, and even might do so, but also performs some functions that the program user would not expect and would not want. Other types of malicious data include spyware (a program that covertly gathers information about the computer user and passes it on to an interested party), dishonest adware (a program that performs some action that brings an advertiser/product to the attention of the computer user), scareware (an application designed to trick computer users into purchasing and downloading useless and potentially dangerous software), crimeware (a computer program or set of programs designed to facilitate illegal activity online), rootkit (a program or suite of programs installed covertly in order to allow unauthorized, privileged access to a system), among other malicious and unwanted software or program.

According to one embodiment, a storage device is configured with a controller, a memory for storing data and a host interface for connecting with a host. The memory contains data locations, access to which is controllable by a protection application which is executable on a host, such that when the storage device is operatively coupled to the host, via the host interface, data locations in the memory are accessible to an operating system of the host only under permission from the protection application. With the storage device operationally coupled to the host as such, the storage device is recognized by the host such that the data locations in the memory are inaccessible by the host operating system. The protection application, when running on a host, is designed to restrict access to a data location in the memory of a connectable device by the host operating system. The protection application may reside in the host, or alternatively may reside in the storage device for loading onto the host.

The controller in the storage device is configured to communicate with the protection application running on the host for allowing the protection application access to data locations in the memory. As will be explained in more detail below, the protection application accesses file system tables and other stored content residing in an area in the memory that is presented to the host as a removable memory in search for malware and other infected files. Upon a host request for access to a data location received by the controller, the controller determines if permission to access the requested data location is acquired from the protection application. The permission is typically based on determination of the protection application that the requested data location does not contain malicious data harmful to the host operating system, to any application and/or to any data on the host.

In general, standard host commands that do not require access to the removable memory area are generated by and communicated to the storage device by any of the components residing on the host or that are executed on the host, including for example the host operating system and other programs running thereon the host. This means that any such communication between the host and the storage device is achieved by host commands prompting the controller in the storage device to perform standard operations. Yet in the context of this disclosure, a set of special commands are used in communication of the protection application running on the host with the controller in the storage device for restricting access to data on a portion of the memory that is presented to the host as a removable memory. More specifically, the set of special commands, which are generated by the protection application, allow for the protection application to access data locations in the memory (on a portion of the memory that is presented to the host as a removable memory) at a time the data locations in the memory (on the removable memory) are deemed inaccessible by the host operating system. In one embodiment, at least one command from the set of special commands includes an operation code that is interpreted by the controller as a special command to read from one or more data locations from the memory, to write to one or more data locations in the memory, or to make data location(s) in the memory accessible by the operating system of the host. Stated differently, a special commands that is issued from the protection application to the controller in the storage device may prompt the controller to read data from a specified data location in the removable memory, to write data to a specified data location in the removable memory, or to make (i.e. user-addressable) data in the removable memory available to the operating system of the host upon a host request.

Such storage device configuration ensures that malicious data being stored in the storage device remains inaccessible to the operating system of the host. This makes it possible to protect the operation of the host and of other host devices in general.

The storage device may be a mass storage device, commonly a USB flash drive (UFD device) or a memory card with nonvolatile memory. A storage device with a nonvolatile memory retains its stored content or stored state even after power is removed. The storage device may have a configuration that complies with any memory (e.g. flash memory), Trusted Flash device, Secure Digital ("SD"), mini SD, micro SD, Hard Drive ("HD"), Memory Stick ("MS"), USB device, Disk-on-Key ("DoK"), Extreme Digital ("xD"), or Multi Media Card ("MMC") specification. The storage device of this disclosure is also applicable with any memory card format, such as a Secured Digital ("SD") memory card format used for storing digital media such as audio, video, or picture files. The storage device may also have a configuration that complies with a High Speed Multi Media Card ("HS-MMC") memory card format, a compact flash ("CF") memory card format, a flash PC (e.g., "ATA Flash") memory card format, a Smart-Media memory card format, a USB flash drive, or with any other industry standard specifications. One supplier of these memory cards is SanDisk Corporation.

The storage device may also have a configuration complying with a high capacity subscriber identity module ("SIM"), also referred to as "HCS", memory card format. The high capacity SIM memory card format is a secure, cost-effective and high-capacity storage solution for the increased requirements of multimedia handset, typically configured to use a host's network capabilities and/or other resources, to thereby enable network communication. Note that the storage device configuration does not depend on the type of removable memory. Accordingly, the teachings described herein can be applied to any type of memory, whether it is a one-type-programmable ("OTP"), few-time-programmable ("FTP"), or any other type of read-write memory, and can be built using standard two-dimensional flash memory or three-dimensional flash memory, or the like.

In general, the storage device of this disclosure may be used in any host device and designed to operate with computer system applications for storing digital content. For these and other applications, the storage device ability to ensure the safety of the operating system, applications and data on a host to which it is connected to, and to protect operation of the host in general, is its primary attribute. Host systems that use such storage devices may be substantially any system or device which sends and retrieves data or information to and from the storage device, including servers, personal computers (PCs), notebook computers and various mobile and handset devices such as hand held computing devices, digital cameras, video cameras, cellular communication devices, audio and video reproducing devices, digital music players such as MP3 players, global positioning devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices.

FIG. 1 illustrates one system 100 with a storage device configured according to one embodiment. System 100 includes a host 102 and a storage device 104 that is operatively coupled to the host 102 via a host interface 106. As shown in FIG. 1, the host 102 has an interface port 102 pluggable to the storage device 104, an operating system 122 running on the host processor (not shown). The host 102 may have more components to meet the needs of a particular application, including one or more user input devices (e.g. keyboard, mouse, a display monitor), communications interfaces (e.g. network adapters, modems) for communicating over computer networks such as the Internet, and one or more buses for coupling its various components, among other units and programs not shown. In one example, the host operating system 122 may conform to the Microsoft Windows™ operating system.

In a typical implementation, the storage device 104 is configured as a portable device for temporarily plugging into the host 102. In such case, the storage device 104 is regarded as "portable", or as "removable", which can be moved from one host device to another, or replaced with another. Nevertheless, the storage device 104 may be optionally regarded as "embedded", meaning that it cannot, and is not intended to customarily be moved by a user from a host device with which it operates. Moreover, whether designed as a removable or as an embedded device for connecting with a host, the storage device 104 may be employed by the host 102 for running boot operations, including the primarily loading of protection program applications onto the host 102 as will be further explained below.

Storage device 104 is configured to prevent access of an operating system 122 of the host 102 to malicious data on the storage device 104, in the event that the storage device 104 has been contaminated. The storage device 104 includes host interface 106, a controller 108 and a memory 110 for storing data. The operational blocks within storage device 104 may be interconnected as illustrated by the arrow-ended connections. In general, the host interface 106 may facilitate wired or wireless communication between the controller 108 and the host device 102 and may include one or more ports, conforming to one or more configuration types, such as the Secure Digital ("SD") port specification, Advanced Security Secure Digital ("ASSD") port specification, embedded Multi-Media Content ("eMMC") port specification, or others.

Memory 110 is typically based on a non-volatile flash-based memory technology. In one embodiment, the memory 110 is presented or emulated to the host 102 as having several partitions or several logical drives. In general, storage device partitioning is the act of dividing a memory of a storage device, such as a removable storage device, into multiple logical storage units that are referred to as "partitions". Partitioning of the memory into multiple logical storage units is typically performed, so that the physical memory is presented or emulated to a host device with which the storage device is connected to as if it were multiple storage areas. Logical storage units are usually used externally, i.e. in external communication with the operating system of a host device, as a higher level of reference to physical memory locations of the memory (e.g. memory 110).

In the example of FIG. 1, the memory 110 is presented or emulated to the host 102 as having several partitions, including a removable partition 114 and a read-only partition 112 in the form of a CD-ROM partition for example. In the context of this disclosure, the removable partition 114 is regarded as a portion of the memory 110 that is presented to the host 102 as a removable memory. With the memory 110 containing data locations, access to which is controllable by a protection application which is executable on the host 102, such data locations are associated with the removable partition 114.

The removable partition 114 contains a user-addressable space provided for holding user data 118, say, in form of user files and applications, including music, video, computer programs, files and other computer-readable data. The removable partition 118 may be formatted to include a computer file system structure, such as a file allocation table (FAT) 120, so that access to files in the user data 118 area is done via the FAT 120. In general, a file allocation table, such as FAT 32, is a computer file system structure that is created for and used on many computer systems and portable storage devices, e.g., flash memory cards. When used on a portable storage device, the FAT is managed by a host to which the storage device is coupled. In other words, a FAT being configured on a storage device is accessible to and further manageable by a host to which the storage device is coupled. In FIG. 1, the FAT 120 stores, e.g. in table structures, information that pertain to the file name, file size, file start cluster, and associated attributes, which relate to the way a directory and associated files located in the user data 118 area are stored in the memory 110 (on the removable partition 114). Though not shown, the memory space that is part of the removable partition 114 may further optionally hold protected data (e.g. that are allowed to be used by authorized host devices only), internal data (e.g. that are used internally by the controller 108), among other types of files and applications. Note that during the insertion of the storage device 104 into the host 102, data being stored on the removable partition 118 (e.g. the user data 118 and the FAT 120) are deemed inaccessible by the operating system 122 of the host 102.

The read-only partition 112, on the other hand, is presented or emulated to the host 102 as a read-only storage area that prevents users from altering its stored data. The read-only partition 112 provides for a read-only storage area storing critical software components, and also advantageously an initial boot area for holding program files and applications for primarily loading on a host. More specifically, the read-only partition 112 is configured to hold protection programs (such as a protection application 116), including anti-virus applications and other program files for primarily loading on the host 102. The contents of the read-only partition 112 may be formed in the factory, during the manufacturing of storage device 104 for example.

As will be more apparent below, the operating system 122 of the host device 102 communicates with the read-only partition 112 as if it were a "CD-ROM drive"; and communicates with (e.g. for reading and writing of data) the removable partition 114 as if it were a regular storage partition, e.g. "USB flash storage drive". This means that the read-only partition 112 may emulate a CD-ROM and thus appear as a CD-ROM drive to an operating system 122 of the host 102. This also means that when plugged into a host 102, the read-only partition 112 will appear and function to the operating system 122 of the host 102 as a separate logical drive that is separate from the removable partition 114. Accordingly, from the host's point of view, user files, user data and user applications reside in the removable partition 114, and program files reside in the read-only partition 112.

The controller 108 is configured to interact with memory 110 and to manage data storage and data transfer in and out of memory 110 directly. The controller 108 is also configured to handle storage commands, such as read, write and erase commands, coming in from a host device and to perform other operations, including application invocation, control functions for power management, control functions for power management, storage device status, and configuration queries and other mass storage operations that require access to memory 110.

As mentioned above, when the host interface 106 is operatively coupled to the host 102, data locations in the memory 110 (on the removable partition 114) are assessable to the operating system 122 of the host 102 only under permission from the protection application 116. Communication of the protection application 116 running on the host 102 with the controller 108 in the storage device 104 allows for the protection application 116 to access data locations in the memory 110. Upon a host request for access to a data location received by the controller 108, the controller 108 determines if permission to access the requested data location is acquired from the protection application 116 on the host 102. The permission, as provided from the protection application 116, is typically based on determination of the protection application 116 that the requested data location does not contain malicious data harmful to the host operating system 122, to any application and/or to any data on the host 102.

The protection application 116 may reside in the host 102 and executed directly from the host 102, or reside externally from the host 102 (e.g. in the storage device 104) and loaded onto the host 102 via the host interface 106 or other suitable communications interface (such as the Internet or the Ethernet). Communication between the controller 108 in the storage device 104 and the protection application 116 on the host 102 is by the protection application 116, for example, upon mounting of the storage device 104 into a port in the host 102 (in case the storage device 104 is removably connected to the host 102), upon initialization of the storage device 104 in the host 102 (in case the storage device 104 is embedded within the host 102), or for example in response to a host request for access to data location(s) in the memory 110.

According to one embodiment, the protection application 116 is a protection program, such as an anti-virus application or the like, operative to identify infected files and other malicious software on a storage medium, such as storage device 104, for restricting or controlling access to data locations in the memory 110 of the storage device 104. For achieving this, the protection application 116 requests access to data stored in the FAT 120 area for analyzing the information stored therein. The protection application 116 analyzes the FAT 120 data, in search for malicious data that may harmful to the host 102, to the host operating system 122 and to their operation. Namely, the application 116 analyzes the FAT 120 data, in search for malicious data that may harmful to the host operating system 122, to any application and/or to any data on the host 102. Note that by analyzing data stored in the FAT 120 area the protection application 116 is operative to identify infected files and other malware with respect to data residing anywhere on the removable partition 114.

The negative effects caused by malware cab be identified and addressed by the protection application 116 in various ways, as known or yet to be known in the art. Accordingly, the way in which the protection application 116 analyzes the data and operates to identify malicious data in the FAT 120 area may depend on the specific design of the protection application 116 and, optionally, on the various applications running on the host 102. In an un-limiting example, the protection application 116 may comprise computer readable program code that, when running on host 102, scans the FAT 120 data in search for viruses and other malicious software. To check for viruses the program code may employ any suitable virus scanning algorithms, some of which involve observing general behaviors associated with malware in addition to scanning of computer files for malware signatures, thus detecting malware. (At this phase, i.e. during the time malware detection is carried out by the protection application 116, data residing anywhere on the removable partition 114 are deemed inaccessible to the host operating system 122.) The protection application 116, including its program code and associated algorithms (some of which are mentioned herein) may be, either regularly or dynamically, updated to meet progressing storage device and system configurations. This may be achieved, for example, in a storage device configuration, where the read-only partition supports a privileged write access feature allowing write operation over a secure communications channel. One possible platform providing a suitable implementation for managing (e.g. writing, updating) program code being stored in a read-only partition is the TCG (trusted computing group) storage architecture, which is a security-based architecture as will be further mentioned below.

Once an infected file, say a virus, is detected with respect to data stored in the memory 110 (i.e. on the removable partition 114), the infected file is handled by the protection application 116 accordingly. The protection application 116 may carry out a variety of response mechanisms for situations when malware behavior is detected. This may include removing the malware and writing back the data, uninfected, to the memory 110; deleting the (infected) data from the memory 110; or (though unlikely) allowing the operating system 122 of the host 102 access to the infected data, or to certain portions thereof. Such, for example, the protection application 116 may be designed to employ conventional antivirus heuristics known in the art for cleaning the infected file and write it back, uninfected, to the memory 110. Either way, once an infected file or other malicious data are identified in the storage device 104 (i.e. on the removable partition 114), the protection application 116 on the host 102 operates to restrict or prevent the malicious data from accessing the operating system 122 of the host 102 and harming its operation.

As already mentioned above, communication between the controller 108 in the storage device 104 and the protection application 116 running on the host 102 is achieved by the protection application 116 employing a set of special commands. A special command from this set of special commands, when issued to the storage device from the protection application, prompt the controller 108 in the storage device 104 to make one or more data locations on the removable partition 114 available to the protection application 116 (while such data location(s) are deemed inaccessible to the host operating system 122). Such command configuration may be achieved by utilizing an application protocol interface (API) 120 that is implemented in the storage device 104. Briefly, an application protocol interface (API) is a set of special commands (rules) and specifications that a software program can follow to access and make use of the services and resources provided by another particular software program that implements the API. The API serves as an interface between different software programs and may include specifications for routines, data structures, object classes, and protocols that may be used to communicate between a consumer program and software program that implements the API.

In one embodiment, at least one of the commands from the set of commands that implement the API 124 includes an operation code that may be interpreted by the controller 108 as a special command to read data from one or more data locations on the removable partition 114 in the memory 110, to write data to one or more data locations on the removable partition 114 in the memory 110, or to make data residing in one or more data locations on the removable partition 114 in the memory 110 available to the operating system 122 of the host 102. This may be applicable in a command block descriptor implementation consisting an operation code (also referred to as "opcode"), followed by some command-specific operations. In a non-limiting example, the set of special commands may conform to the Small-Computer-System-Interface (SCSI) protocol. In computer systems and computer storage, the SCSI protocol defines the way of which a computer system communicates with a connectable device, such as the storage device 104. In the context of this disclosure, with the set of special commands conforming to the SCSI protocol for example, the operation code is typically vendor-specific and may be defined in various ways to indicate to the storage device 104 and to the host 102, and more particularly to the controller 108 and to the protection application 116 running on the host 102, the existence of a vendor-unique (e.g. read, write, expose data) command. Such command configuration prompts the controller 108 to perform command parsing according to a subsequent set of parameters. An exemplary command configuration that may comply with the set of special commands mentioned herein will be provided in more detail in conjunction with FIG. 2A.

Note that the set of special commands that implement the API 124 on the storage device 104 may conform to any other communication protocol that defines the way the protection application 116 running on the host 102 communicates, or interacts with the controller 108 in the storage device 104 for supporting the above-mentioned (e.g. read, write (erase) and expose) operations. It should be also noted that the API 124 implementation may be embedded within the controller 108, or designed as a stand-alone component that communicates with the controller 108.

Returning to FIG. 1, the above-described protection application 116 may reside in the host 102 and executed directly from the host 102, or may be an executable file that is loaded onto the host 102 by using a suitable communications interface. In one embodiment, the protection application 116 is an executable file residing on the storage device 104 and loaded onto the host 102 from the storage device 104, via the host interface 106, for automatically running by the operating system 122 of the host 102 at boot time. Loading the protection application 116 on the host operating system 122 at boot time may be achieved in a storage device architecture, in a region of the memory space that is presented to a host as a read-only partition (i.e. that is outside the user-addressable space) and provided for holding initial boot code, authentication program and other programs (such as the protection application 116) for primarily loading on the host 102. For example, in a TCG™ (trusted computing group) storage architecture, this region in the memory is referred to as a "shadow-MBR" (shorthand for "shadow-Master Boot Record"), where data that would typically be available at the bottom of the LBA (logical block address) space, e.g. LBA=0 to LBA=128, is replaced by initial boot image (such as for operating various encryption-related devices) for primarily loading onto a host.

With the protection application 116 residing on the storage device 104, the protection application 116 may be configured, for example as an executable file, to run on the host 102 without installing or copying components of the protection application 116 into local storage components on the host 102. This increases the portability of the storage device 104 and its use with several, differently owned host computers. For similar reasons, the protection application 116 preferably does not involve components requiring reboot of a host computer and/or modification of any sort on a host computer. Moreover, with the protection application 116 configured as an executable file that is verified and checked for viruses, for example during the manufacturing of the storage device, eliminates the possibility that the protection application 116 is contaminated and advantageously allows for ensuring that the host 102 (and not only the storage device 104) is not contaminated. Nevertheless, this is not meant to limit the scope of this disclosure, so that the protection application 116 may be optionally copied (loaded) onto the internal memory of a host (e.g. host 102) for actually residing on the host 102, for example on a non-volatile memory component of the host 102.

Termination of the protection application 116 on the host 102 may be performed automatically or manually (e.g. by the user). In one example, with the storage device 104 configured as a portable device for temporarily plugging into the host 102, the execution of the protection application 116 on the host 102 may (e.g. automatically) terminate upon removing the storage device 104 out of the host 102. In another example, the protection application 116 may create a user interface, such as a system tray entry in the Microsoft Windows™ operating system, to allow the user to manually perform an orderly shutdown of the protection application 116 and its components.

To provide a higher level of assurance, if the storage device 104 includes secure media (that is password protected for example), then communication between the controller 108 in the storage device 104 and the protection application 116 running on the host 102 is contingent on performing mutual authentication between the host 102 and the storage device 104. In such case, the controller 108 allows the protection application 116 access to data locations on the removable partition 114 only after mutual authentication between the host 102 and the storage device 104 is successfully performed. This means that storage operations (e.g. read and write operations) as well as data operations (e.g. data transfer, application loading, etc.) between the storage device 104 and the host 102 may be permitted and enabled conditional on a mutual authentication between the storage device 104 and the host 102. The authentication process may involve an exchange of an authorized password between the storage device 104 and the host 102 for opening a secure session with the host 102. One example of a suitable implementation of a mutual authentication process may be achieved, for example, by using a key exchange mechanism that is identical or similar to the key-exchange mechanism employed by IEEE 1667 Silo. Briefly, IEEE 1667 ("Standard Protocol for Authentication in Host Attachments of Transient Storage Devices") is a standard that describes a method for authenticating storage devices, such a USB flash drives, when they are interfaced with a computer. IEEE 1667 is described with regard to an article by Donald Rich entitled "Authentication in Transient Storage Device Attachments", which is incorporated here by reference in its entirety.

The user may be prompted by the host 102 to enter a password by using a menu or other form of graphical user interface that is initially displayed on the host 102, or alternatively by utilizing a display device that is connected to the host 102. Multiple passwords could optionally used by multiple users to protect different data files and storage areas, or for storing multiple data files, each referring to or associated with files relevant to a different user.

The above-disclosed storage device configuration protects host operations from potential infection of malicious data from the storage device 104 and insures that once the data in the memory 110 is accessible to the operating system 122 of the host 102 it does not contain malware of any sort that can possibly infect the host 102 and/or the host operating system 122 and affect (e.g. harm) their operation. The way the controller 108 operates to handle such data transfer will be described in more detail below, with respect to FIG. 3 and FIG. 4.

Although the examples provided herein focus on the protection application 116 being a protection program that, when running on the host 102, communicates with storage device 104 by utilizing the API 124 implementation on the storage device 104, it is contemplated that the protection application 116 may be generally configured, when running on a host, to communicate with a connectable device in any other way that is known in the art or yet to be discovered. Moreover, by configuring the controller 108 in the storage device 104 to communicate with a protection application on a host to restrict access to data locations in the storage device 104 by a host operating system as such, it is possible to securely operate the storage device 104 with any host device without fear of infecting the host with malicious data and harming its operation.

Functions associated with controller 108 are typically implemented, but need not necessarily, either in software, firmware or hardware, either in a single or as separate functional blocks, as shown in FIG. 1.

Figure 2A:
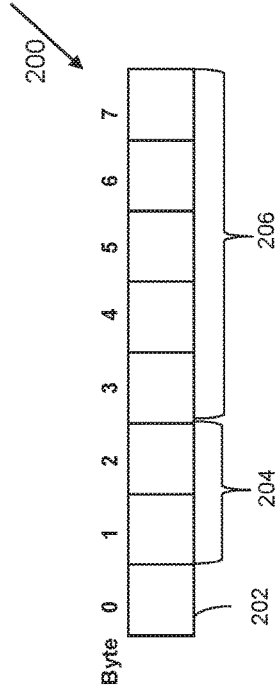
FIG. 2A illustrates a command configuration with respect to a set of commands that implement the API in the storage device, according to one embodiment.

FIG. 2A illustrates a command configuration provided for a set of special commands that implement the API in the storage device 104, according to one embodiment. FIG. 2A will be described in association with FIG. 1, where the set of special commands that implement the API 124 allow for the protection application 116 on the host 102 to communicate with the controller 108 in the storage device 104. Communication with the controller 108 in the storage device 104 prompt operation of the controller 108 according to the way that is specified in the special command received by the controller 108.

The set of special commands, when issued by the protection application 116, prompt the controller 108 to access one or more data locations in the memory 110; namely, on the removable partition 114. In one embodiment, at least one special command from the set of special commands that are communicated to the storage device 104 from the protection application 116 include an operation code (and optionally other parameters) that are interpreted by the controller 108 as a special command to read from a data location(s) on the removable partition 114 ("special read command"), to write to a data location(s) on the removable partition 114("special write command"), or to make a data location(s) on the removable partition 114 accessible by the operating system 122 of the host 102 upon host request ("special expose command").

In a non-limiting example, such special command configuration is associated with a special command, or a set of special commands, that comply with the SCSI protocol. Per FIG. 2A, the command block descriptor 200 consists of a 1 byte opcode field (shown at 202) followed by a (e.g. 2-byte) ID field (shown at 204) and a memory information field (shown at 206). The opcode field (202) contains an operation code (such as the pre-defined opcode 0xff for example) that indicates to the controller 108 the existence of a vendor-specific command. The ID field (204) holds parameters, in form of a vendor-specific opcode for example, that specify to the controller 108 the nature of the special command (i.e. which operation the controller 108 is required to perform). That is, whether it should perform a special read, a special write, or any other special operation. The memory information field (206) contains information that indicates to the controller 108 how much data to read or write and where to read from or to write the data to. Such information may pertain to the type and/or the location of the data in the memory 110 (i.e. in the removable partition 114), to the amount of data required to read or write, to data residing in the FAT 120, among other internal memory and storage information. The controller 108, upon receiving a special command from the protection application 116, via the API 124, operates to handle the special command according to and based on the operation code and other parameters, as specified in the ID field (204) and in the memory information field (206) of the received command.

Such command configuration provides for a set of special commands (e.g. "special write command", "special read command", and "special expose command", among other possible commands) that, when implemented as part of the API 124 in the storage device 104, enable the protection application 116 on the host 102 to communicate with the controller 108 for accessing the removable partition 114 at a time this memory location (and associated data) are inaccessible by the operating system 122 of the host 102.

Figure 2B:
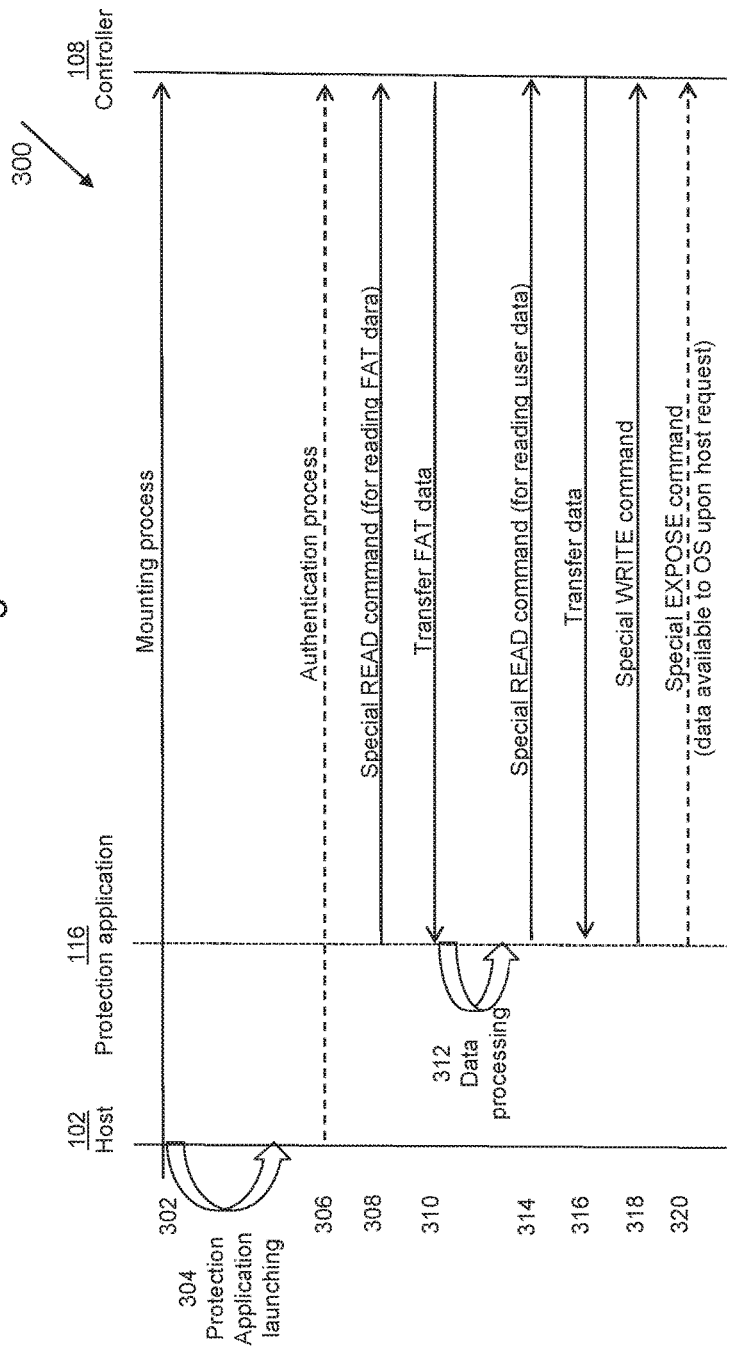
FIG. 2B illustrates a command flow between the host and the storage device, according to one embodiment.

FIG. 2B illustrates a command exchange 300 between the protection application 116 on the host 102 and the controller 108 of the storage device 104, according to one embodiment. FIG. 2B will be described in association 1 with FIG. 2A, where the protection application 116 is an executable file that is loaded from the storage device 104 for running on the host 102 to restrict access to data on the removable partition 114 by the host operating system 122. A particular implementation of method 400 includes the protection application 116 running on the host 102, the storage device 104 configured as a portable device for mounting into a port in the host 102 and the controller 108 in the storage device 104 for communicating with the protection application 116 on the host 102. Again, communication of the protection application 116 with the controller 108 in the storage device 104 is enabled via a set special of commands that implement the API 124 on the storage device 104.

A user inserts the storage device 104 into the interface port 103 of the host 102 to begin use of the storage device 104. The insertion of the storage device 104 into the interface port 103 may be detected by drivers or components of the operating system 122. This triggers a "mounting process" in which a communication channel between the host 102 and the storage device 104 is established. During the "mounting process", the host 102 establishes rules for communication with the connectable storage device 104, which rules may refer, for example, to information transfer rate, coding alphabet, communication protocol, hardware features, and so on. The "mounting process" is shown at 302. Following this, the read-only partition 112 and the removable partition 114 are mounted on the host 102 and identified as separate logical drives in front of the host operating system 122.

Next, the protection application 116 is launched on the host 102 for restricting access to data on the removable partition 114 by the host operating system 122. With the protection application 116 residing on the storage device 104, the host operating system 122 typically runs the protection application code from the read-only partition 112, for launching the protection application 116 on the host 102 (for example at boot time). The launching of the protection application 116 on the host 102 ("launching process") shown at 304 may be performed automatically, e.g. upon mounting the storage device 104 to the host 102, or manually, i.e. by the user.

If the removable partition 114 is a secure media, for example, then an "authentication process" providing for mutual authentication between the storage device 104 and the host 102 may follow. The authentication process, being an optional process shown at 306, is typically initiated by the host 102 and involves an exchange of an authorized password between the storage device 104 and the host 102 for opening a secure session with the host 102. This means that the controller 108 must authenticate itself in front of the host 102 before allowing the protection application 116 on the host 102 access to the requested data on the removable partition 114. Alternatively, an authentication process providing for mutual authentication between the storage device 104 and the host 102 can be (e.g. automatically) executed as part of the "mounting process" that is shown at 302.

After the protection application 116 is launched on the host 102, the protection application 116 communicates with the controller 108 of the storage deviec 104 by issuing a "special read command" for accessing the FAT 120 area. The "special read command" that is issued by the protection application 116 is shown at 308. In response to the "special read command" that is received from the protection application 116 at 308, the controller 108 accesses the removable partition 114 and provides the protection application 116 access to requested data residing in the FAT 120. Namely, the controller 108 accesses the FAT 120 and transfers, to the protection application 116, requested FAT data and other (e.g. file system) information stored therein, as specified in the ID field (204) and memory information field (206) of the received command. This data transfer that is performed by the controller 108 is shown at 310.

Next, the protection application 116 analyzes the FAT data received from the controller 108 of the storage device 104, in search for infected files and other possible malware residing anywhere on the removable partition 114. The start up of the "data processing" process, shown at 312, may result in the protection application 116 employing any well known scanning algorithm that scans the received FAT 120 data for identifying viruses and other infected files that may be malicious to the host 102 and/or to the host operating system and may affect (e.g. harm) their operation.

With possible malware detected, the protection application issues another "special read command", at 314, this time for reading the infected data from its location in the user data 118 area on the removable partition 114. Responsive to the special command, the controller 108 accesses the user data 118 and transfers (at 316) the requested data (the infected data) to the protection application 116, allowing the protection application 116 to handle the malware in the user data 118 area accordingly. At this stage, the removable partition 114, in general, and the FAT 120 and the user data, in particular, are deemed inaccessible to the host operating system 122.

Per FIG. 2B, if a virus or other sort of malware is identified with respect to data being stored anywhere on the removable partition 114, the protection application 116 may employ various antivirus heuristics, some of which are mentioned above, for removing ("cleaning") the malware from the received data. Note that once a virus is identified, the protection application 116 may alternatively handle the malicious data in any other way, such as by instructing the controller 108 to delete the received (infected) data, or portions thereof, from the removable partition 114. This is achieved by the protection application 116 issuing a "special write command", at 318, for writing back the data, as uninfected, to the removable partition 114 in the memory 110 (or, alternatively, for deleting the malware from the memory 110).

The command transfer shown at 308 through 318 may be repeated multiple times, each time for accessing a different data location in FAT 120 and/or a different data location within the user data 118 area, as required by the protection application 116 and further depending on the specific design and its implementation. Thus, for example, in case malware is detected in the FAT 120 with respect to data residing in various data locations within the user data 118 area, the protection application 116 may issue multiple commands, each command for reading a different datum portion of the user data 118. That is, each command requiring access to a different (infected) data location on the removable partition 114, for handling the (infected) data residing therein accordingly.

With the protection application 116 determining that data locations on the removable partition 114 do not contain malicious data harmful to the host operating system, to any application and/or to any data on the host, the protection application 116 acquires permission for the controller 108 to access a requested data location, for example within the user data 118 area, on the removable partition 116 and notifies the controller 108 accordingly. The indication that is sent from the protection application 116 to the controller 108 may be issued in form of a "special expose command", as shown at 318, notifying the controller 108 that a requested data location does not contain malicious data harmful to the host operating system 122, to any application and/or to any data on the host 102. If sent, the "special expose command" notifies the controller 108 that the requested data location in the memory 110, namely data associated with the user data 118 area and other stored content residing on the removable partition 114, are safe and may be accessible by the host operating system 122 upon a host request.

It should be noted that the command flow described herein above with respect to FIG. 2B is an example only that is not meant to limit the scope of this disclosure, so that various modifications, variations, alterations, situations, and equivalents can be apparent and any activity can be repeated and any activity can be performed by multiple entities. For example, the mutual authentication process (shown at 306) is an optional process that is initiated by the host 102 and typically meant to provide a higher level of assurance in communication between the host 102 and the storage device 104. Such authentication can also be performed as (an integral) part of the "mounting process" (at 302), e.g., upon insertion of the storage device 104 into a port in the host 102. Moreover, the way in which the protection application 116 running on the host 102 operates and further interacts with the controller 108 in the storage device 104 may depend on the specific implementation logic of controller 108 and, optionally, on the various applications running on the controller 108. Thus, for example, in one implementation, the controller 108 may issue an acknowledgment signal to the host 102 after each interaction with the host 102 and/or the protection application 116 running thereon on the host 102. Alternatively, the acknowledgment may be issued only after the controller 108 finishes to perform all the operations that are required for accessing requested data from the removable partition 114.

If anyone of the fields of the special commands (e.g. "special read command", "special read command", "special expose command") issued by the protection application 116 contains an opcode or other parameter that is invalid or not supported by the storage device 104, then the controller 108 may be operated to terminate the special command without altering the medium (and, optionally, without altering the open session between the storage device 104 and the host 102). This may be the case, for example, if a specified memory location is out of range or is associated with a domain area that is not within the removable partition 114. In such cases, the controller 108 in the storage device 104 may respond by sending the user, and/or the protection application 116 on the host 102 a check-condition status, notifying the receiving entities of the existence of an illegal request.

Advantageously, the tasks that are part of the launching of the protection application 116 on the host 102 ("application launching") at 304, the scanning and analyzing of data by the protection application 116 ("data processing") at 316, and other operations performed by the controller and/or the protection application 116 do not necessarily require reboot of the host 102 or installation of permanent files into local storage components on the host 102.

As can be, such command flow provides for the protection application 116 on the host 102 to access the removable partition 114 for restricting access to data locations on the removable partition 114 by the operating system 122 of the host 102. Making data locations on the removable partition 114 accessible to the protection application 116 provides for the protection application 116 to identify infected files, so that a host request for access to data location(s) in the memory 110 is made available to the host operating system 122 if permission to access the requested data location(s) is acquired from the protection application 116, where the permission is based on determination of the protection application 116 that the requested data location does not contain malicious data harmful to the host operating system 122, to any application and/or to any data on the host 102.

Figure 3:
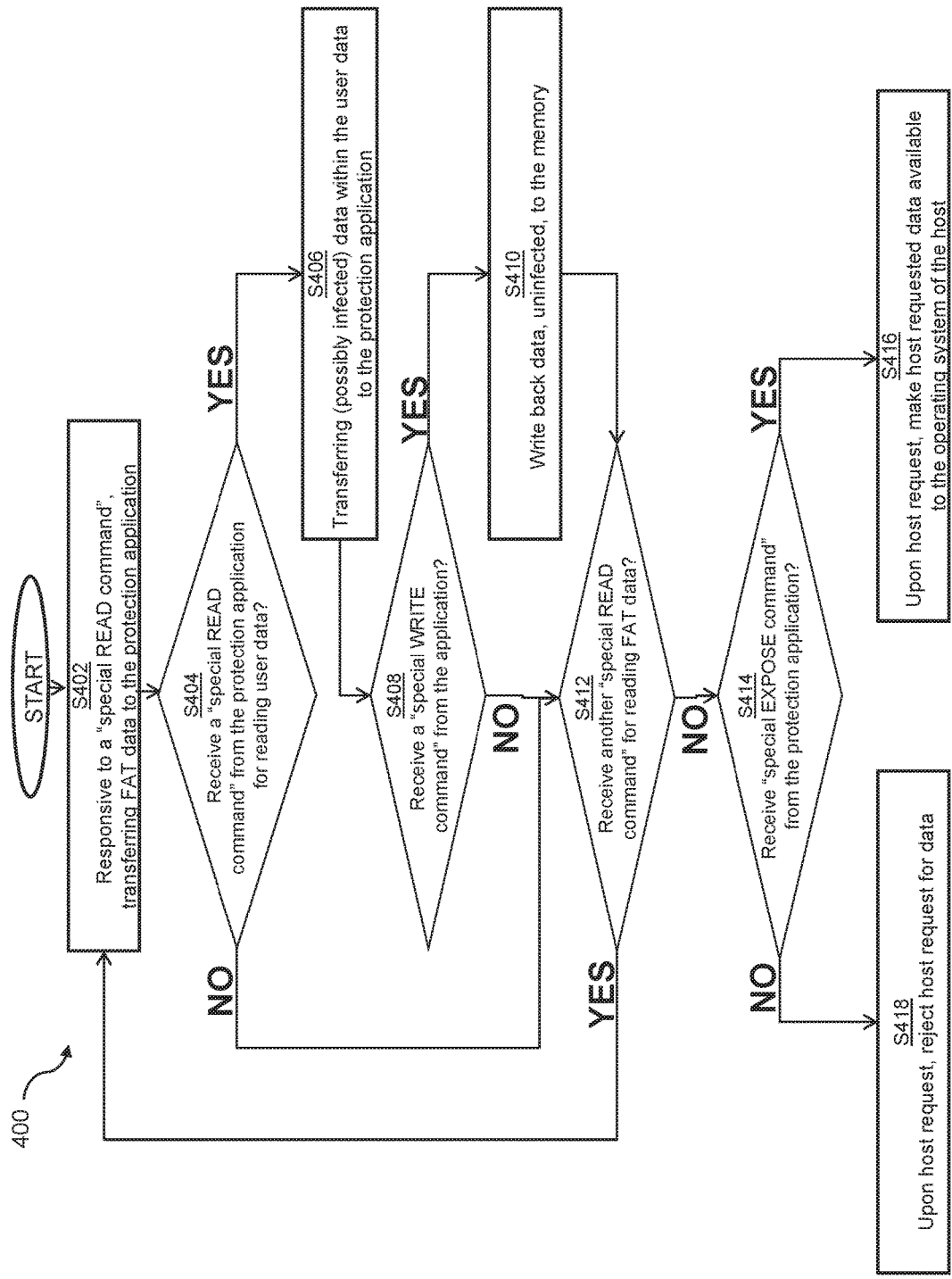
FIG. 3 is a flow diagram of a method for handling commands within the storage device, according to one embodiment.

FIG. 3 is a flow diagram illustrating a method 400 for handling commands within the storage device, according to one embodiment. FIG. 3 will be described in conjunction with FIG. 1. Method 400 is performed by controller 108 within storage device 104 for handling commands between the storage device 104 and the protection application 116 on the host 102. A particular implementation of method 400 includes the protection application 116 running on the host 102 and communicating with the controller 108 in the storage device 104 for restricting access to data locations in the memory by the host operating system 122. Communication between the protection application 116 running on the host 102 and the controller 108 in the storage device 104 is achieved by utilizing a set of special commands (e.g. "special read command", "special write command", and "special expose command") that implement the API 124 on the storage device 104.

At step S402, in response to the controller 108 receiving a "special read command" requiring access to one or more data locations in the FAT 120, the controller 108 transfers the FAT data associated with the requested data location to the protection application 116. Namely, the controller 108 accesses the requested data location in the FAT 120 for reading the FAT data stored therein, as specified in the ID field (204) and memory information field (206) of the special command received by the controller 108. Making data location(s) in the FAT 120 available to the protection application 116 as such prompts the protection application 116 to scan and analyze the received FAT data, in search for possible malware with respect to data locations within the user data 118 area. Again, the protection application 116 may scan the received FAT data by employing any well known scanning algorithm that scans the information stored in the FAT 120 for identifying viruses and other malicious data harmful to the host operating system 122, to any application and/or to any data on the host.

Next, the controller 108 determines, at S404, whether a "special read command" is received from the protection application 116, this time for reading from a data location within the user data 118 area on the removable partition. If such a command is received (shown as "YES" at step S404), this typically means that possible malware is identified in the FAT 120 with respect to data being stored in the user data 118 area. Responsive to the command, the controller 108 transfers, at S406, the requested (infected) user data to the protection application 116. This provides for the protection application 116 to handle the (infected) data accordingly. If a "special read command" for reading from a data location within the user data 118 is not issued to the controller 108 by the protection application 116 (shown as "NO" at S404), then the method proceeds to step S412.

Accordingly, at step S408, the controller 108 determines if a special command, in form of a "special write command", for writing to (or optionally deleting from) a data location within the user data 118 on the removable partition 114 is received from the protection application 116 on the host 102. If such a command is received (shown as "YES" at S408), then the controller 108 writes back the data, as uninfected, to its respective data location on the removable partition 114 (S410). The controller 108 writes back the data to the removable partition 114, at S410, as specified in the ID field (204) and memory information field (206) of the received command. As already explained above, the protection application 116 may carry out a variety of other response mechanisms for situations when malware behavior is detected in the memory 110, such with the "special write command" specifying a sequence of zeros in the memory information field (206), for example, the controller 108 may be prompted to deleting data, or (infected) portions thereof, from its respective location in the memory 110. If a "special write command" is not received by the controller 108 (shown as "NO" at S408), then the method proceeds to step S412.

At step S412, the controller 108 determines whether another "special read command" is issued to the storage device 104 from the protection application 116 on the host 102. If another such command is received (shown as "YES" at S412) with respect to an additional data location in the FAT 120, then the controller 108 returns to carry out step S402, where additional FAT data is made available to the protection application 116, scanned and analyzed accordingly. Again, for determining that data in the storage device 104 is, or does not contain any data that is malicious to the host 102 and/or to the host operating system 122, steps S402 to S412 may be repeated multiple times, each time with respect to a different data location(s) in the FAT 120 area (and, optionally, with respect to a different data location(s) within the user data 118 area), as required by the protection application 116 and further depending on the specific design and its implementation.

If another "special read command" is not received from the protection application (shown as "NO" at S412), then this typically means that malware is not identified in the FAT 120 with respect to any data on the removable partition 114. In one embodiment and as further shown in FIG. 3, the protection application 116, upon determining that requested data location(s) do not contain malicious data harmful to the host operating system 122, to any application and/or to any data on the host 102, is designed to permit the controller 108 to access a data location(s) on the removable partition 114 in the memory 110 upon a host request and notify the controller 108 in the storage device 104 accordingly. The indication, which may be sent in form of a "special expose command", notifies the controller 108 that a data on the removable partition 114 is "safe" and acquires the controller 108 permission to access host requested data. Again, the "special expose command" is part of the API 124 implementation on the storage device 104. Accordingly, with the controller 108 receiving a "special expose command" from the protection application (shown as "YES" at S414), the controller 108 makes host requested data within the user data 118 area available to the host operating system 122, as shown at S416.

However, if an indication, in form of a "special expose command", is not received from the protection application 116 (shown as "NO" at S414), then the controller 108 prevents the host operating system 122 from accessing the host requested data, at S418, and may notify the user and/or the host operating system 122 accordingly. By preventing the host operating system 122 access to host requested data as such, data locations and associated data (e.g. the user data 118) on the removable partition 114 remains inaccessible by the host operation system 122.

Figure 4:
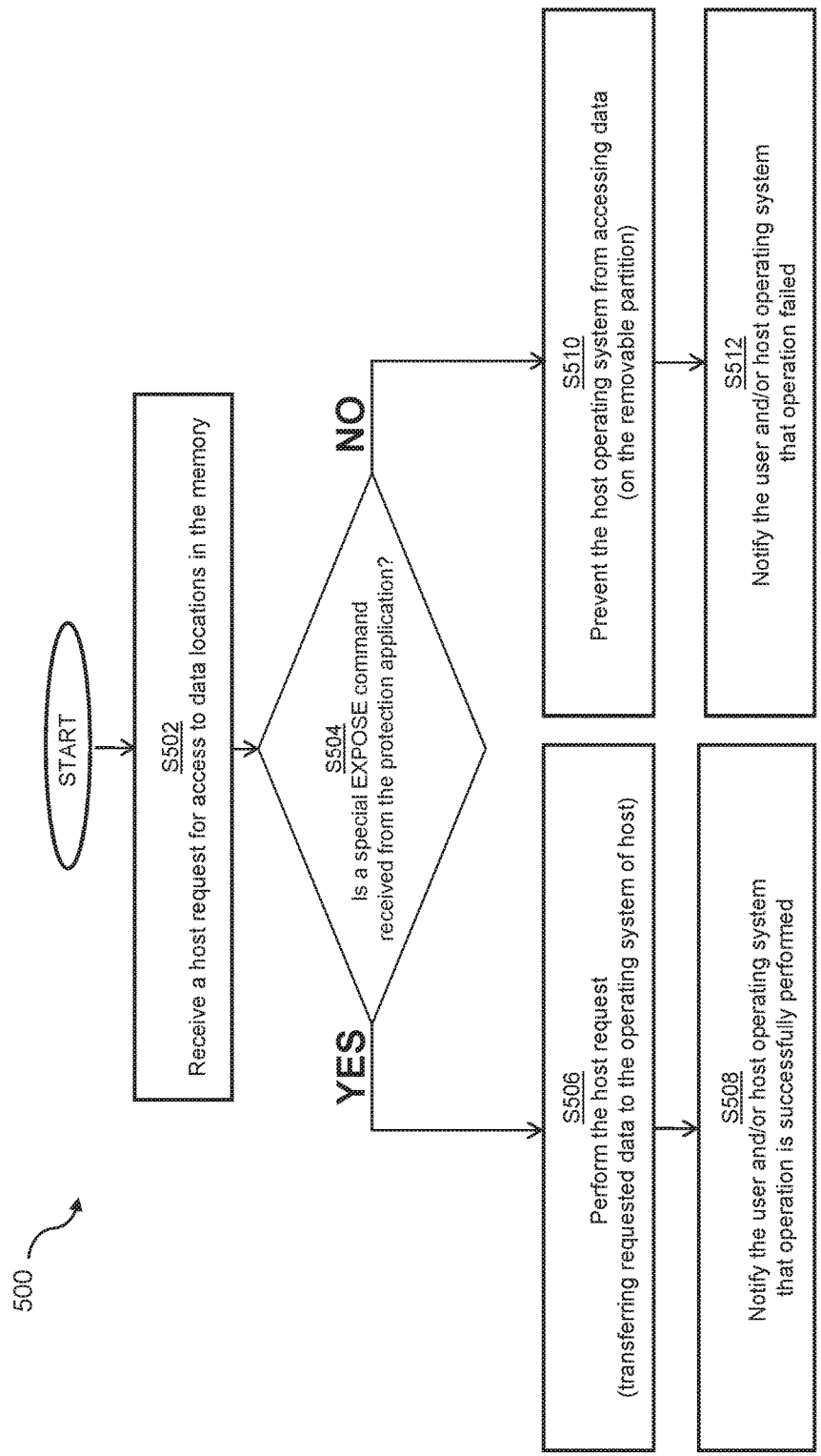
FIG. 4 is a flow diagram of a method for handling a host request for access to a data location within the storage device.

FIG. 4 is a flow diagram illustrating a method 500 for handling a host request for access to a data location within the storage device, according to one embodiment. FIG. 4 will be described in conjunction with FIG. 1. Method 500 is performed by the controller 108 within the storage device 104, where when the storage device 104 is operatively coupled to the host 102 via the host interface 106 data locations on the removable partition 114 in the memory 110 are accessible to the host operating system 122 only under permission from the protection application 116 running on the host 102.

At step S502, the controller 108 receives a host request for access to data locations in the memory 110 of the storage device 104. The request, being in form of a special read or special write command received by the controller 108 from the protection application 116 on the host 102, may be for example a command to read from a requested data location within the user data 118 area on the removable partition 114 or to write to a requested data location within the user data 118 on the removable partition 114.

At step S504, the controller 108 determines whether permission to access the requested data location in the memory 110 is acquired from the protection application 116. More specifically, the controller 108 determines whether an indication, typically in form of a "special expose command", is received from the protection application 116 on the host 102 for permitting the controller 108 to make data associated with the requested data location on the removable partition 114 accessible by the host operating system 122. If such a command is received (shown as "YES" at S504), then the controller 108 performs the host request by transferring (at S506) the host requested data to the host 102. The controller 108 then notifies (at S508) the user and/or host operating system 122 that the operation is successfully performed. However, if an indication to make the requested data location on the removable partition 114 available to the host operating system 122 has not being received by the storage device 104 (shown as "NO" at S504), then the controller 108 prevents, at S510, the host operating system 122 from accessing this data location and associated data (e.g. the user data 118) on the removable partition 114. The controller 108 may then notify (at S512) the user and/or the host operating system 122 accordingly.

The processes proposed in methods 400 and 500 provide for, in a storage device operationally coupled to a host, communicating data between a storage device and a host in a way that is secure to the host by communicating with a protection application running on the host for allowing the protection application access to data locations in the memory, so that access to a host requested data location in the memory by the controller is conditioned on the controller acquiring permission from the protection application to access the requested data location. The permission is based on determination of the protection application that the requested data location does not contain malicious data harmful to the host operating system, to any application and/or to any data on the host. Advantageously, executing host commands within the storage device as such enables to operate the storage device with any hosting device, providing the host having a protection application running thereon to restrict access to data in the storage device by the operating system of the host as mentioned herein.

Figure 5:
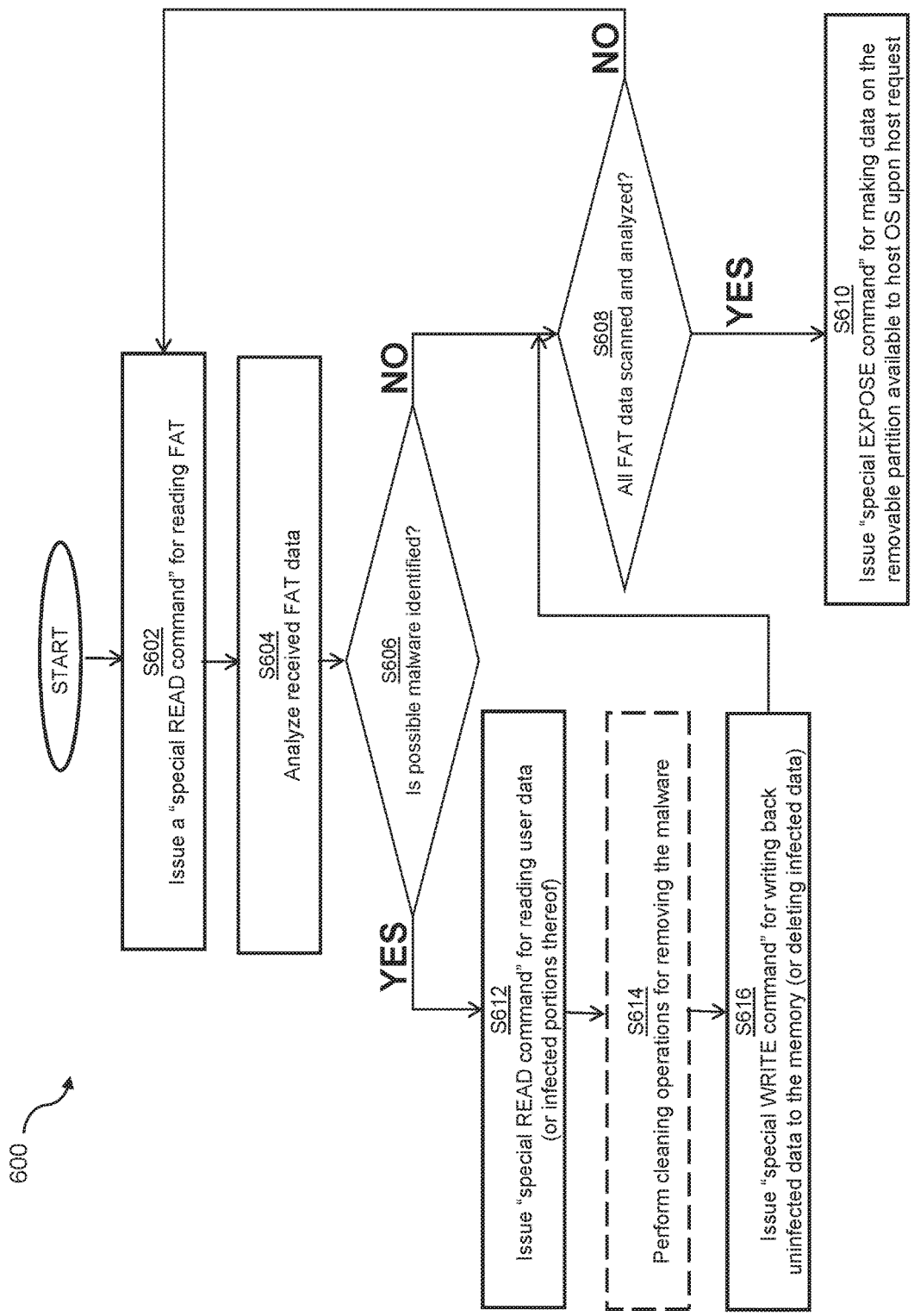
FIG. 5 is a flow diagram of a method of restricting access to a data location in the storage device, according to one embodiment.

FIG. 5 is a flow diagram illustrating a method 600 of restricting access to data in the storage device, according to one embodiment. FIG. 5 will be described in conjunction with FIG. 1. Method 600 is performed by the protection application 116 that, when running on the host 102, communicates with the controller 108 in the storage device 104 for restricting access to data locations on the removable partition 114 by the host operating system 122. Again, the protection application 116 is designed to communicate with the controller 108 in the storage device 104 by employing a set of special commands that implement the API 124 on the storage device 104.

At step S602, the protection application 116 issues a request for accessing data locations(s) in the FAT 120 area for reading FAT data stored therein. The request, being in form of a "special read command", may be for example a request to access the FAT 120 table structures for reading the metadata and/or other information stored therein. Following this, at step S604, the protection application 116 scans and analyzes the received FAT data in search for infected files and other malicious data. As mentioned above, this step typically involves employing any well known scanning algorithm that scans the received FAT data for identifying viruses and other infected files that may be harmful to the host operating system 122, to any application and/or to any data on the host 102.

With the protection application 116 not identifying possible malware (shown as "YES" at step S606), the protection application 116 determines, at S608, whether all the FAT data is scanned for viruses. In the negative case, i.e. if not all of the data in the FAT 120 is scanned (shown as "NO" at S608), then the method proceeds to step S602, where another "special read command" is issued by the protection application 116 to the controller 108 for reading from another (e.g. subsequent) data location in the FAT 120 area, as specified by the special command. However, if it is determined that all the data in the FAT 120 is indeed scanned (shown as "YES" at S608), the protection application 116 issues, at S610, an indication to the storage device 104 (to the controller 108) permitting the controller 108 to make data locations on the removable partition 114 available by the host operating system 122 upon a host request. The indication, in form of a "special expose command", notifies the controller 108 that data on the storage device 104 (typically residing on the removable partition 114) is now safe and may be made available to the host operating system 122 upon a host request.

Returning to step S608, if possible malware is identified in the FAT 120 with respect to any (infected) data in the user data 118 area, then the protection application 116 issues a "special read command" for reading data from the user data 118 area, or from infected data locations thereof. For handling the infected data, the protection application 116 may employ any well known (cleaning) operations for removing the malware from its respective data location(s) within the FAT 120 and the user data 118 area on the removable partition 114 (at S614). Then, at S616, the protection application 116 issues a "special write command" for writing back the data, as uninfected, to its respective data location(s) on the removable partition 114 in the memory 110 (at S616). Alternatively, the "special write command" may be issued for deleting the infected data from its data location in the user data 118 area on the removable partition 114. Following this, the method proceeds to step S608, where the protection application 116 determines whether all the data in the FAT 120 is scanned for viruses. Here again, if the entire FAT 120 is scanned then the protection application 116 proceeds to perform step S610, where it issues a "special expose command" for making data locations on the removable partition 114 available to the host operating system 122 upon a host request. And, if not all the FAT data is scanned, then the protection application 116 proceeds to step S602, for reading data from yet another data location within the FAT 120 and operating accordingly.

In sum, the foregoing described a storage device having a memory, a controller, and a host interface that is operative to connect with a host. A protection application running thereon on the host is provided to restrict access to data on the storage device by the operating system of the host. More specifically, the protection application is designed to restrict access to data being stored in a portion of the memory that is presented to the host as a removable memory. The memory contains data locations, access to which is controllable by a protection application executable on the host, such that when the storage device is operatively coupled to the host via the host interface data locations in the memory are accessible to an operating system of the host only under permission from the protection application.

In an embodiment, when the host interface is operatively coupled to a host the storage device is recognized by the host such that the data locations in the memory (that is, in the portion of the memory that is presented to the host as the removable memory) are inaccessible by an operating system of the host. The controller communicates with the protection application running on the host for allowing the protection application access to data locations in the memory. The protection application may employ an antivirus protection application that is operative to identify infected files on the removable memory. Upon a host request for access to a data location received by the controller, determines if permission to access the requested data location is acquired from the protection application. The permission is typically based on determination of the protection application that the requested data location does not contain malicious data harmful to the host operating system, to any application and/or to any data on the host.

The controller may be configured to provide the host operating system access to the host requested data conditioned on an indication coming in from the protection application, which indication notifies the controller that the requested data location does not contain malicious data harmful to the host operating system, to any application and/or to any data on the host. Such indication, if received, may prompt the controller in the storage device to make a requested data location, for example associated with the user data area, available to the host operating system upon a host request. Communication of the protection application running on the host with the controller in the storage device is performed by the protection application employing a set of special commands that conform to a communication protocol. In an embodiment, the set of special commands include an operation code that may be interpreted by the controller as a special command to read from a data location in the memory, to write to a data location in the memory, or to make a data location in the memory accessible by the operating system of the host. This allows for communicating data in and out of the storage device when the storage device is operatively coupled to a host in a way that ensures that the host and/or host operating system is protected from receiving infected files or other malicious data from the storage device.

The disclosure also contemplates a method for communicating data between a storage device and a host. The method comprises, in a storage device having a memory, a controller and a host interface, data locations in the memory (again, in a portion of the memory that is presented to the host as a removable memory) are accessible to an operating system of the host only under permission from the protection application, the controller communicating with the protection application running on the host for allowing the protection application access to data locations in the memory; and upon a host request for access to a data location received by the controller, determining if permission to access the requested data location is acquired from the protection application.

Although the foregoing embodiments have been described in considerable detail with reference to certain preferred versions thereof, other embodiments and versions are possible. Accordingly, the contents of this disclosure are not to be limited in scope by the specific embodiments described herein. Indeed, various modifications, variations, alterations, situations, and equivalents will be apparent to those skilled in the art from the foregoing description and accompanying drawings. Moreover, any activity can be repeated, any activity can be performed by multiple entities, and/or any element can be duplicated. Further, any activity or element can be excluded, the sequence of activities can vary, and/or the interrelationship of elements can vary.

Such, for example, although the embodiments have been described primarily with regard to a read-only partition representing files in a read only memory arrangement and to a removable partition for storing user data, it will be understood that the storage device could be adapted to operate in other data structures and other file system configurations. Further, the functionality of the various features of the described embodiments may be distributed differently. For example, conventional flash memory devices include a flash manager, i.e. a type of internal controller, which manages ingress and egress of data and other internal processes, such as wear leveling, translation of logical memory addresses into physical memory addresses and vice versa. Therefore, the controller 108 of FIG. 1 can either be a separate component that interacts with a flash manager, or the functionalities of a flash manager can be integrated, embedded, or affiliated into the controller 108. According to another example, although the host interface 106 is shown in FIG. 1 as a separate component, it can be an integral part of the controller 108. As can be, the spirit and scope of the appended claims should not be limited to the description of the preferred embodiments and versions contained herein.

It will be apparent to one of ordinary skilled in the art that the embodiments as described above may be implemented in many different forms of software, firmware, and hardware components, such as application specific integrated circuits (ASICs), in the implementations illustrated in the figures. The actual software code or specialized control hardware used to implement aspects consistent with the foregoing detailed description is not limiting of the foregoing detailed description. Thus, the operation and behavior of the embodiments were described without specific reference to the specific software code, it being understood that a person of ordinary skill in the art would be able to design software and control hardware to implement the embodiments of the description herein.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method for protecting a host device, comprising:
   performing a mutual authentication between a storage device and the host device using a key exchange mechanism, the storage device contains a read only partition and a removable partition;
   copying a protection application from the read only partition of the storage device to a memory in the host device, wherein the storage device is connected to the host device;
   running the protection application on the host device, wherein the protection application restricts access from the removable partition of the storage device by the host device;
   then requesting, by the protection application, access to a file allocation table data of the removable partition for analyzing information stored therein;
   then sending the file allocation table data to the protection application on the host device;
   then analyzing the file allocation table data;
   determining if the protection application on the host device has finished a scanning of the file allocation table data; and
   pursuant to the finishing of the scanning of the file allocation table data, sending an expose command to a controller of the storage device to notify that the data in the removable partition of the storage device is safe and available for use by the host device.

2. The method according to claim 1, wherein the restricting of the access to the file allocation table data on the storage device is through a controller on the storage device.

3. The method according to claim 1, further comprising:
   sending a command with the protection application from the host device to the storage device.

4. The method according to claim 3, wherein the command that is sent from the protection application to the storage device provides protection application access to memory areas of the storage device with the restricted access.

5. The method according to claim 4, wherein the command instructs a controller in the storage device to read data from a specified data location in a removable memory allocation of the storage device.

6. The method according to claim 4, wherein the command instructs a controller in the storage device to write data to a specified data location in a removable memory allocation of the storage device.

7. The method according to claim 1, wherein the storage device is a universal serial bus device.

8. The method according to claim 1, wherein the storage device is one of a secure digital, a mini SD, a micro SD, a hard drive, a memory stick and a multi-media card.

9. The method according to claim 1, wherein the host device is one of a computer, a hand held computing device, a server, a cellular communication device, an audio reproducing device, a global positioning device and a video camera.

10. The method according to claim 1, wherein the storage device has at least two memory partitions.

11. The method according to claim 10, wherein a first of the memory partitions is a removable partition.

12. The method according to claim 11, wherein a second of the memory partitions is a read-only partition.

13. The method according to 11, wherein the restricting access to the file allocation table data on the storage device by the host device is to the removable partition.

14. The method according to claim 1, further comprising:
   analyzing the removable partition for a presence of a virus by the protection application.

15. The method according to claim 14, wherein the analyzing the removable partition involves analyzing the file allocation table data.

16. The method according to claim 15, further comprising:
   transferring data infected by the virus to the protection application.

17. The method according to claim 16, further comprising:
   cleaning the transferred data infected by the virus in the protection application.

18. An apparatus, comprising:
means for performing a mutual authentication between a storage device and a host device using a key exchange mechanism, the storage device contains a read only partition and a removable partition;
means for storing data, the means for storing data being operatively connected to a host device;
means for providing a copy protection application from the read only partition of the means for storing data to a memory in the host device;
means for running the protection application on the host device, wherein the protection application restricts access from the removable partition of the storage device by the host device;
means for requesting, by the protection application, access to a file allocation table data of the removable partition for analyzing information stored therein;
means for sending the file allocation table data to the protection application on the host device;
means for analyzing the file allocation table data;
means for determining if the protection application on the host device has finished a scanning of the file allocation table data; and
means for pursuant to the finishing of the scanning of the file allocation table data, sending an expose command to a controller of the storage device to notify that the data in the removable partition of the storage device is safe and available for use by the host device.

19. The apparatus according to claim 18, wherein the means for storing data has a first partition and a second partition.

20. The apparatus according to claim 19, wherein the first partition is viewed at the host device as a removable partition and the second partition is viewed at the host device as a read-only device.

* * * * *